(12) United States Patent
Forster

(10) Patent No.: US 9,767,405 B2
(45) Date of Patent: Sep. 19, 2017

(54) RFID DEVICE WITH ELONGATED STRUCTURE

(75) Inventor: Ian James Forster, Chelmsford (GB)

(73) Assignee: AVERY DENNISON RETAIL INFORMATION SERVICES, LLC, Westborough, MA (US)

( * ) Notice: Subject to any disclaimer, the term of this patent is extended or adjusted under 35 U.S.C. 154(b) by 0 days.

(21) Appl. No.: 14/343,013

(22) PCT Filed: Sep. 7, 2012

(86) PCT No.: PCT/US2012/054095
§ 371 (c)(1),
(2), (4) Date: Mar. 5, 2014

(87) PCT Pub. No.: WO2013/036725
PCT Pub. Date: Mar. 14, 2013

(65) Prior Publication Data
US 2014/0209694 A1    Jul. 31, 2014

Related U.S. Application Data

(60) Provisional application No. 61/532,524, filed on Sep. 8, 2011.

(51) Int. Cl.
| | |
|---|---|
| *G06K 19/06* | (2006.01) |
| *G06K 19/077* | (2006.01) |
| *G08B 13/24* | (2006.01) |
| *H01Q 1/22* | (2006.01) |
| *H01Q 9/26* | (2006.01) |

(52) U.S. Cl.
CPC ... *G06K 19/07773* (2013.01); *G06K 19/0779* (2013.01); *G06K 19/07758* (2013.01); *G06K 19/07771* (2013.01); *G06K 19/07786* (2013.01); *G06K 19/07798* (2013.01);
(Continued)

(58) Field of Classification Search
USPC .......................... 235/492; 340/572.1–572.9
See application file for complete search history.

(56) References Cited

U.S. PATENT DOCUMENTS

| | | | |
|---|---|---|---|
| 5,512,879 A * | 4/1996 | Stokes | G08B 21/22 340/539.1 |
| 6,043,746 A * | 3/2000 | Sorrells | G06K 19/07749 340/572.1 |

(Continued)

FOREIGN PATENT DOCUMENTS

WO    2006053692    5/2006

OTHER PUBLICATIONS

International Search Report and Written Opinion dated Dec. 6, 2012 for International Application No. PCT/US2012/054095.

*Primary Examiner* — Jamara Franklin
(74) *Attorney, Agent, or Firm* — Avery Dennison Retail Information Services, LLC

(57) ABSTRACT

A radio frequency identification ("RFID") antenna structure such as may be found on a tag, label or inlay for use with consumer products that has a conductive surface. The RFID structure of the present invention can be attached to the conductive surface without significantly modifying the performance of the RFID device. The RFID device has first and second portions, with the first portion having a first antenna pattern and the second portion including an elongate section for attachment to the consumer item.

24 Claims, 5 Drawing Sheets

(52) U.S. Cl.
CPC ..... *G08B 13/2417* (2013.01); *G08B 13/2434* (2013.01); *H01Q 1/2225* (2013.01); *H01Q 9/26* (2013.01)

(56) References Cited

U.S. PATENT DOCUMENTS

| | | | |
|---|---|---|---|
| 7,135,973 B2 * | 11/2006 | Kittel | G08B 13/1445 340/568.2 |
| 2004/0066296 A1 | 4/2004 | Atherton | |
| 2005/0128086 A1 * | 6/2005 | Brown | G06K 19/07728 340/572.8 |
| 2007/0125867 A1 | 6/2007 | Oberle | |

* cited by examiner

RFID DEVICE WITH ELONGATED STRUCTURE

CROSS-REFERENCE TO RELATED APPLICATION(S)

The present application is a 371 of International Application No. PCT/US2012/054095, which was published in English on Mar. 14, 2013, which claims priority to U.S. Provisional Application No. 61/532,524 filed Sep. 8, 2011, each of which is incorporated herein by reference in its entirety.

FIELD

The present invention is in the field of radio frequency identification ("RFID") devices and more particularly to RFID devices used in connection with consumer goods which may have an adverse impact on the performance of the RFID device.

BACKGROUND

RFID tags can be used to allow a fast inventory of items in a retail environment, for example jewelry placed in a display case. It is important that such a RFID tag is placed onto the item in a way that is both secure and unobtrusive. Typically, a pricing label is applied to the article with a thin extension or tab that wraps around some portion of the jewelry item to identify the piece to the customer and to provide an indication as to the price for the retailer.

In order to obtain maximum performance from a RFID tag it is desirable that the tag is as large as possible. In particular, it is believed that increasing the length, increasing the dimension towards that of a half wave dipole, will help increase antenna gain and efficiency. However, creating such a RFID device can be expensive.

RFID devices that have small antennas, such as those that can be inserted into a label suitable for attaching to a broad variety of jewelry items, tend to have a relatively narrow operating frequency bandwidth and as such are not as desirable as other options.

Another problem associated with labeling consumer items such as jewelry is for a part of the antenna to be placed into the tab that is connected or attached to the jewelry item. However, with the typical jewelry or other tab, the antenna comes into contact or proximity of the conductive material of the jewelry or other consumer item causing the RFID device to couple to the metal of jewelry item which will then alter the operating frequency of the antenna and potentially reduce the performance.

What is needed, therefore, is a construction that utilizes a relatively small RFID device that can be implemented with traditional jewelry tagging labels.

BRIEF SUMMARY

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

This invention relates to electrically small RFID tags designed to be attached to metallic objects such as jewelry, where, to increase performance, the RFID tag antenna is extended into the tab. This tab causes the RFID tag to interact strongly with the metallic object and can cause it to deviate from the wanted frequency substantially if a simple single conductive line tab extension is used. By modifying the tab structure of the antenna, the act of folding the tab structure around the metallic object can be compensated for stabilizing the operating frequency and thereby allowing higher performance.

In this invention modified forms of antenna extensions designed to go into the tab section are proposed. These antenna forms compensate more than a simple antenna structures when the tab is wrapped around a metallic object, thereby reducing the effective length of the antenna.

An antenna structure is shown in FIG. 1. When an elongated label structure incorporating the antenna structure is folded back upon itself as shown in FIG. 5 the reduction in length is directly proportional to the degree of folding.

In one exemplary embodiment, A RFID antenna structure for use with a RFID tag is described and includes a conductive material that has first and second portions with the first portion having a first antenna pattern and the second portion having a second antenna pattern distinct from the first antenna pattern. The second antenna portion cooperates with a conductive surface and the second portion is folded on itself and attached to a part of the conductive surface such that the second portion does not significantly modify performance of the first portion.

In another exemplary embodiment, a RFID device is described and includes the antenna structure described above, a chip and a label structure. The antenna structure is applied to the surface of the label structure.

In another exemplary embodiment, a RFID device is provided with a label to enable connection of the RFID device to a consumer item such as jewelry. The resulting structure does not result in decreased performance.

Other features and advantages of the present invention will become apparent to those skilled in the art from the following detailed description. It is to be understood, however, that the detailed description of the various embodiments and specific examples, while indicating preferred and other embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

These, as well as other objects and advantages of this invention, will be more completely understood and appreciated by referring to the following more detailed description of the presently preferred exemplary embodiments of the invention in conjunction with the accompanying drawings, of which.

DETAILED DESCRIPTION

The apparatuses and methods disclosed in this document are described in detail by way of examples and with reference to the figures. Unless otherwise specified, like numbers in the figures indicate references to the same, similar, or corresponding elements throughout the figures. It will be appreciated that modifications to disclosed and described examples, arrangements, configurations, components, elements, apparatuses, methods, materials, etc. can be made and may be desired for a specific application. In this disclosure, any identification of specific shapes, materials, techniques, arrangements, etc. are either related to a specific example presented or are merely a general description of such a shape, material, technique, arrangement, etc. Identifications of specific details or examples are not intended to be, and should not be, construed as mandatory or limiting unless specifically designated as such. Selected examples of apparatuses and methods are hereinafter disclosed and described in detail with reference made to FIGURES.

As used herein the term tag is intended to include labels, tags, inlays and the like which are commonly used in connection with creating RFID devices.

Figure 7:
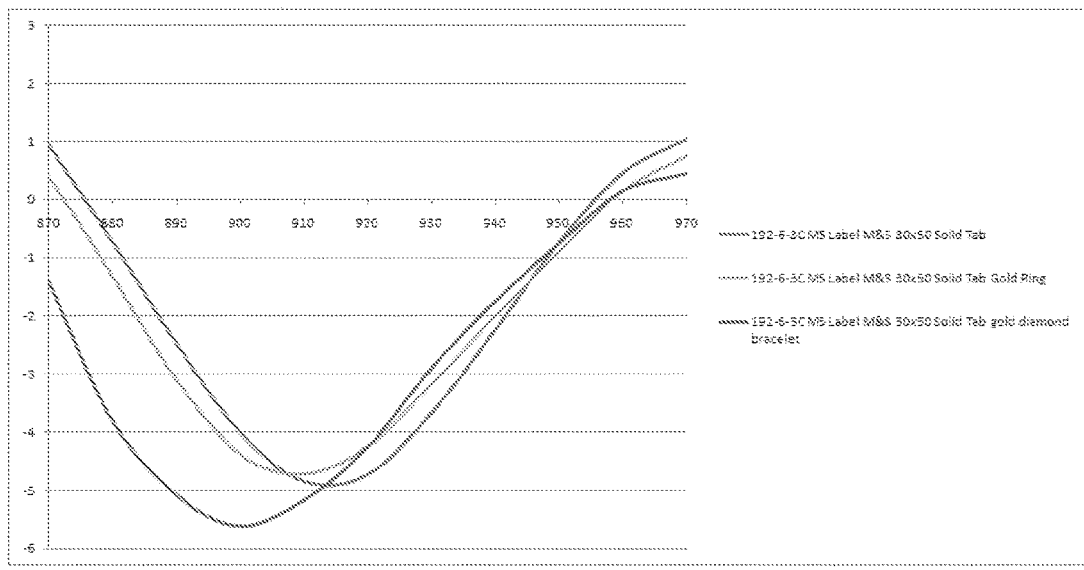
FIG. 7 is a graph that shows the sensitivity frequency response of the tag design with the simple tab; on a relatively small object, such as a gold ring, and illustrates that the frequency deviation is small.

The graph shown in FIG. 7 shows the sensitivity frequency response of the tag design with the simple tab; on a relatively small object, such as a gold ring, the frequency deviation is small. However, on a larger linear object, such as a bracelet, there is significant frequency deviation.

Figure 2:
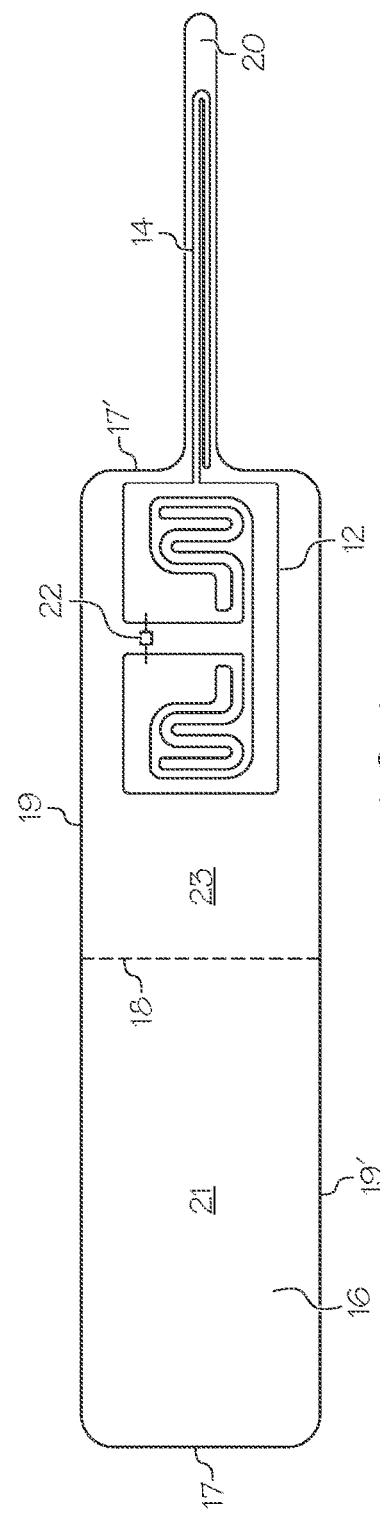
FIG. 2 illustrates the antenna structure with a chip attached to label material forming an RFID device.

In a preferred of the invention embodiment the extension of the antenna structure into the tab section of the label is in the form of a paddle shape, a large head with a smaller handle portion, as illustrated in FIG. 2.

In its un-mounted state the antenna structure is extended by the length of the line forming the handle of the paddle or the elongated portion extending away from the antenna tab section and the design is made to respond at the desired frequency in this state.

Figure 6:
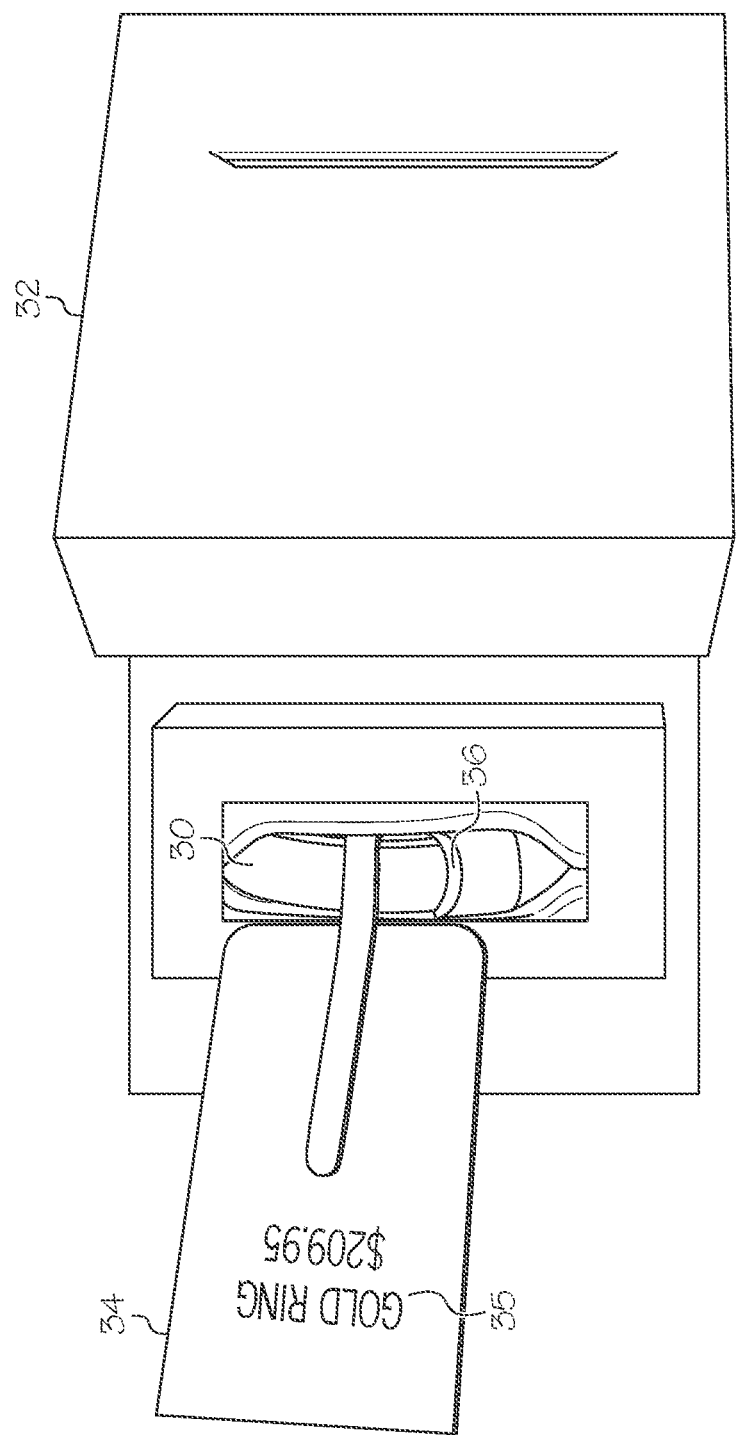
FIG. 6 illustrates the label and inlay structure applied to a consumer item having a conductive element.

When the tab 14/20 is wrapped around a metal object such as a ring, bracelet, watch, or other metal item, such as shown in FIG. 6 the proximity effect of the metal reduces the effective antenna length by an amount greater than the change in effective length that compensates to some degree for the length extension caused by the antenna field coupling into the metal object, stabilizing the operating frequency.

Figure 8:
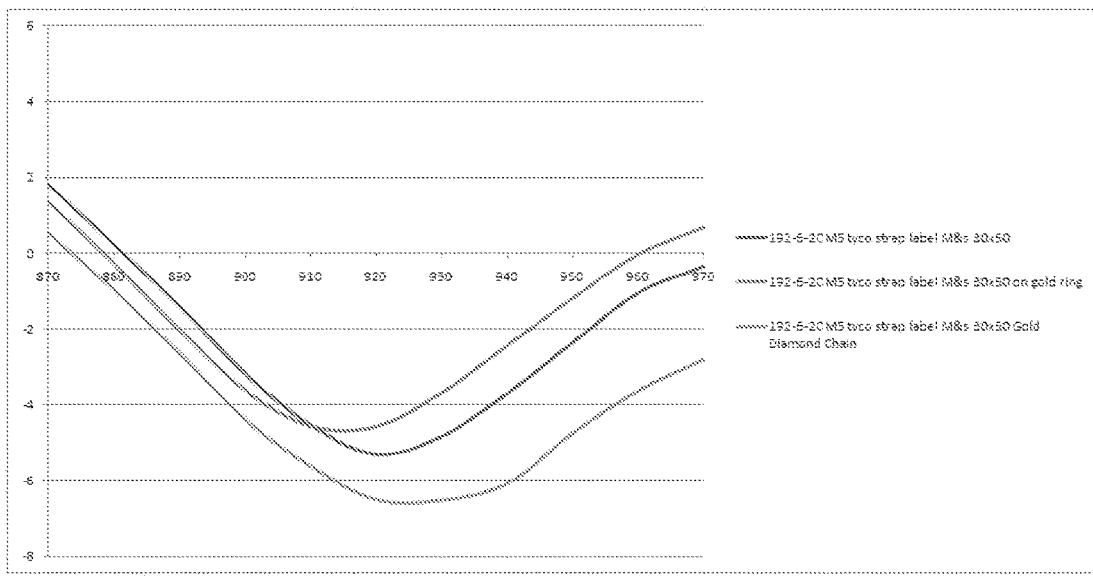
FIG. 8 is a graph that shows the effect of the tag as modified in accordance with the present invention.

In FIG. 8, the effect of the modified tag can be seen. On the ring, as before, the frequency is similar to that of the label on its own. However, now when attached to the bracelet, the frequency response has not dropped giving better performance.

Figure 1:
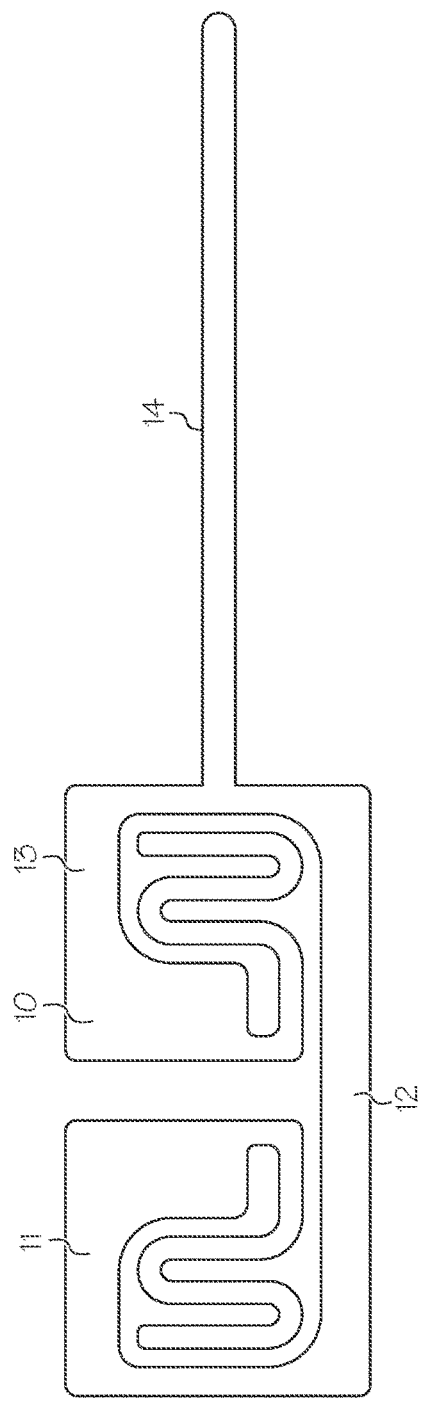
FIG. 1 depicts an exemplary antenna structure for use with the present invention.

Reference is now directed to FIG. 1 which shows the antenna design generally designated by reference numeral 10. The antenna design 10 includes a first section 12 and a second section 14 which is an elongated portion extending generally way from the first section or portion 12. The first portion 12 is shown as a dipole antenna and includes generally a pattern that is formed from a conductive material such as aluminum and has first and second parts 11 and 13. The first and second portions, 12 and 14, are distinct from one another and the first section 12 can have first and second parts to form the antenna structure 10.

FIG. 2 shows the antenna structure 10 applied to a surface of a substrate such as a label structure 16. The substrate can include any type of material such as card stock, pressure sensitive label material, films, papers, foam, woven and non-woven materials and the like.

The substrate or label structure 16 has both longitudinal 19 and 19' and transverse edges 17 and 17'. The label structure 16, in one exemplary embodiment has a fold line 18 which runs about half way through the length of the structure 16 and forms first and second sections 21 and 23 and allows the label structure 16 to be folded on itself to cover the first portion 12 of the antenna. It should be understood that the substrate or label structure may have any particular dimensions and the fold line may be disposed at any appropriate location on the substrate depending on the particular design of the tag, label or inlay.

The label structure 16 also includes an extended portion 20 on which the second portion 14 is placed. The extended portion can extend from at least one transverse 17, 17' or longitudinal edges 19, 19' of the label structure. The present invention contemplates that in one embodiment the label structure 16 may serve as the conductive portion that formed the antenna structure of the present invention. The extended portion 20 is generally longer and wider than the second portion 14 of the antenna structure 10 but is not required to be and may instead have equal or substantially equal dimensions to that of the second portion 14. FIG. 2 also shows a chip 22 attached to the antenna to form a RFID device. The chip may either be attached directly to the antenna or may be attached via the use of a strap which is what is depicted in FIG. 3 or other connection.

It will be appreciated that any number of other structures that provide a degree of compensation for folding and proximity to metal may be created.

Figure 3:
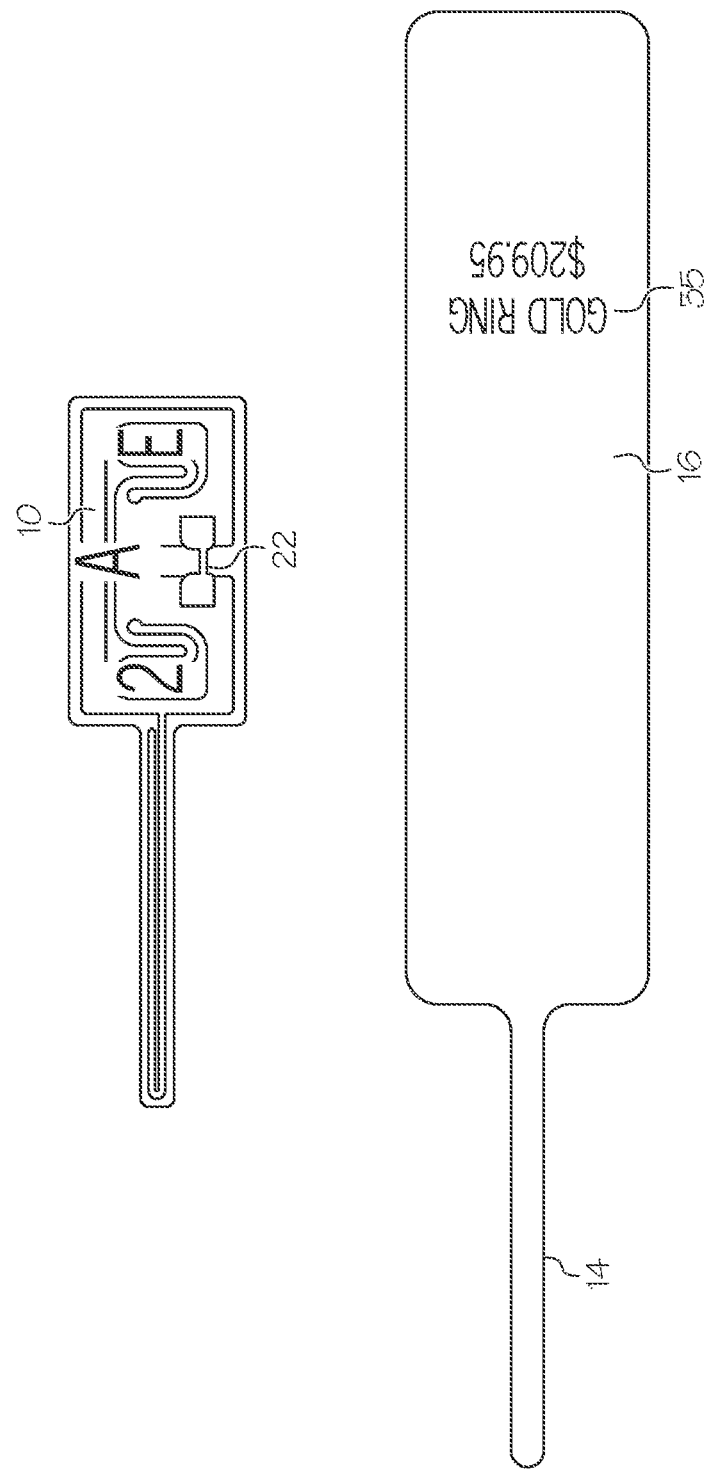
FIG. 3 provides an inlay and label material.

FIG. 3 provides a representative view of the antenna structure 10 attached to a strap/chip 22 adjacent the label structure 16 to show the approximate size of each. The label structure is approximately two times the size of the antenna structure so as to allow the antenna structure to be concealed by the label structure when it is folded over on itself. It should be understood that the label structure or substrate can be of any particular size or configuration which may be used to cover or conceal the RFID device. The substrate may also be provided with printed indicia 35 which may include variable or fixed printing such as pricing or product information.

The RFID antenna structure 10 shown in the FIGURES may be provided as part of a RFID inlay, label or tag which is available from Avery Dennison RFID Company of Clinton, S.C. The present invention contemplates that the antenna structure 10 of the present invention may be a wide variety of antenna types such as loop, dipole, or slot antenna.

Figure 4:
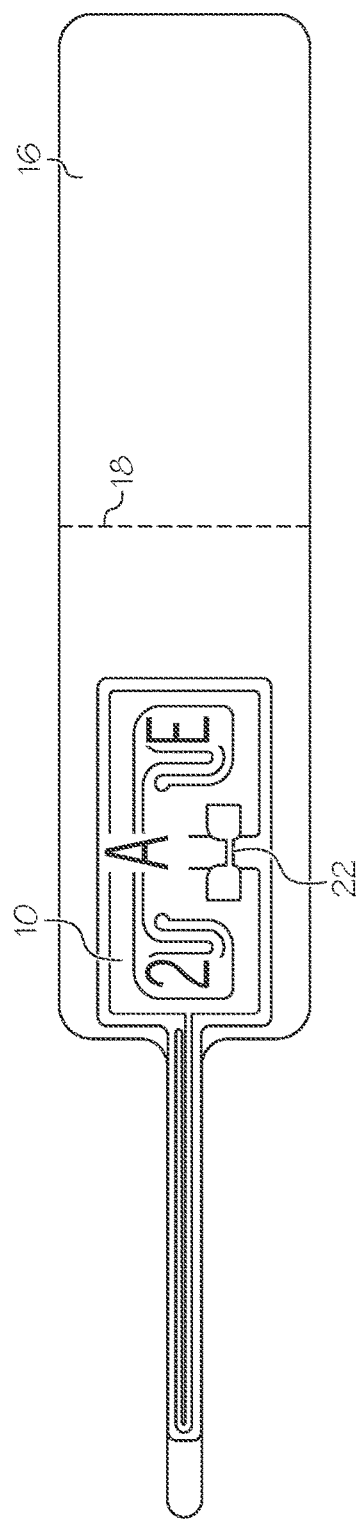
FIG. 4 shows an inlay applied to the label material, forming an RFID device.

FIG. 4 provides a further illustration of the antenna structure 10 with an RFID chip 22 applied to the label structure 16, creating an RFID device.

Figure 5:
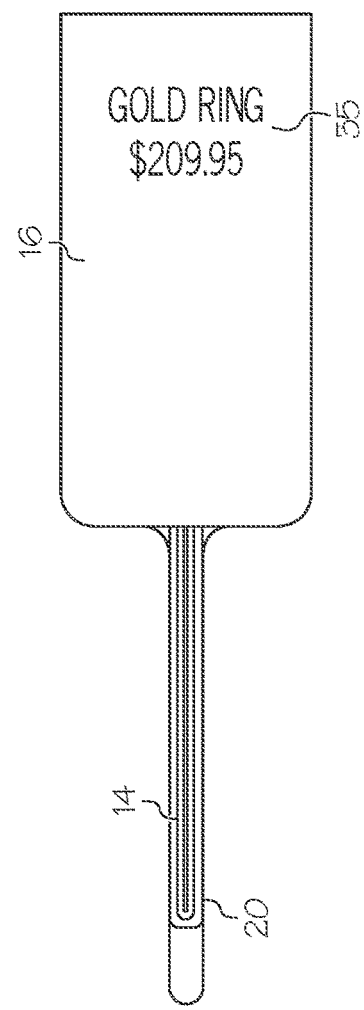
FIG. 5 depicts the label material folded over the inlay.

FIG. 5 provides an illustration of the label structure 16 folded over the antenna structure and chip 22 fully concealing the first portion of the antenna (not shown) but allowing the second portion 14 of the antenna structure to still be exposed on the elongated portion 20 of the label structure 16.

FIG. 6 shows an exemplary use of the presently described invention, in which a piece of jewelry, such as a gold ring 30 is provided in a retail display box 32. The label structure 34 which conceals the first portion of the antenna structure is attached to the ring 30 by the elongated section 36 of the label structure 34 by wrapping the elongated section onto itself and through the opening in the ring. While the antenna would couple to the conductive material the elongated section of the antenna by wrapping onto itself effectively retunes the antenna so that performance of the antenna is not materially altered as shown in the graph above. Indicia 35 may be provided on the label or substrate for identification purposes.

The present invention contemplates that in one embodiment the RFID tag of the present invention has more than one extending portion 20 of the label structure 16. The multiple elongated portions may be used to join a plurality of articles such as earrings.

The present invention contemplates that in a further embodiment more than one antenna structure 10 may be applied to a label structure 16 of the present invention. An additional RFID chip 22 may also be applied. The chip may be applied directly to the antenna or as part of a strap based configuration.

The present invention further contemplates that the tag of the present invention may serve a dual purpose. Specifically, the tag of the present invention may serve both a RFID function and EAS function.

In one embodiment the RFID tag functions at an ultra high frequency (UHF) range, a high frequency range (HF) or low frequency range (LF).

While the embodiments described herein relate to jewelry items, it should be understood that this invention may be equally suitable for use with other applications which have a metal component, such as plumbing, hardware, electrical, automotive, transportation, marine, apparel accessories, and the like.

It will thus be seen according to the present invention a highly advantageous RFID tag for use with conductive consumer products such as jewelry has been provided. While the invention has been described in connection with what is presently considered to be the most practical and preferred embodiment, it will be apparent to those of ordinary skill in the art that the invention is not to be limited to the disclosed embodiment, and that many modifications and equivalent arrangements may be made thereof within the scope of the invention, which scope is to be accorded the broadest interpretation of the appended claims so as to encompass all equivalent structures and products.

The inventors hereby state their intent to rely on the Doctrine of Equivalents to determine and assess the reasonably fair scope of their invention as it pertains to any apparatus, system, method or article not materially departing from but outside the literal scope of the invention as set out in the following claims.

What is claimed is:

1. An RFID antenna structure for use with an RFID device, comprising;
   a conductive material having first and second portions;
   the first portion having a first antenna pattern and the second portion having a second antenna pattern distinct from the first antenna pattern;
   the second antenna pattern cooperates with a conductive surface; and
   wherein the second portion is folded onto a section of the second portion and attached to a part of the conductive surface such that the second portion does not significantly modify performance of the first portion and the antenna structure is wrapped which effectively retunes the antenna structure.

2. The RFID antenna structure of claim 1, wherein the second portion is an elongated shape.

3. The RFID antenna structure of claim 1, wherein the first portion is a dipole antenna.

4. The RFID antenna structure of claim 1, wherein the first portion includes a pattern that is formed from conductive material.

5. The RFID antenna structure of claim 1, wherein the antenna structure is a patterned aluminum foil.

6. The RFID antenna structure of claim 1, wherein the antenna structure is selected from the group consisting of a dipole antenna, a slot antenna, and a loop antenna.

7. An RFID label for use with jewelry, comprising
   an RFID device, the RFID device having an antenna structure with first and second antenna sections which are distinct from one another and the antenna structure is a patterned aluminum foil;
   a label substrate sized and configured to accommodate the RFID device;
   at least one piece of jewelry;
   the RFID device is provided on a surface of the label substrate and the label substrate is folded over the RFID device; and
   the label with the RFID device is attached to the at least one piece of jewelry which effectively retunes the antenna structure without loss of performance of the RFID device when the RFID device couples to the at least one piece of jewelry.

8. The RFID device of claim 7, wherein the label structure contains at least one extended portion.

9. The RFID device of claim 8, wherein the label structure is attached to the at least one piece of jewelry by the extended portion.

10. The RFID device of claim 8, wherein the extended portion is attached by wrapping the extended portion around a portion of the jewelry.

11. The RFID device of claim 10, wherein the wrapping of the antenna structure effectively retunes the antenna structure.

12. The RFID device of claim 7, wherein the label structure has a plurality of extended portions.

13. An RFID device, comprising:
    an RFID antenna structure comprising;
    a conductive material having first and second portions;
    the first portion having a first antenna pattern and the second portion having a second antenna pattern distinct from the first antenna pattern;
    the second antenna pattern cooperates with a conductive surface; and
    wherein the second portion is folded onto a section of the second portion and attached to a part of the conductive surface such that the second portion does not significantly modify performance of the first portion, and
    a chip and a substrate, wherein the antenna structure is applied to a surface of the substrate and the substrate is a label structure and the label structure has a fold line which runs about half way through the length of the label structure and allows the label structure to be folded over the first portion of the antenna.

14. The RFID device of claim 13, wherein the substrate is a label structure and the label structure has a fold line which runs about half way through the length of the label structure and allows the label structure to be folded along said fold line to cover the first portion of the antenna.

15. The RFID device of claim 13, wherein the substrate includes at least one extended portion.

16. The RFID device of claim 15, wherein the at least one extended portion extends from at least one longitudinal edge of the label substrate.

17. The RFID device of claim 15, wherein the at least one extended portion extends from at least one transverse edge of the label substrate.

18. The RFID device of claim 13, wherein the second portion of the antenna structure is placed on the extended portion.

19. The RFID device of claim 13, wherein the substrate serves as the conductive portion that formed the antenna structure.

20. The RFID device of claim 13, wherein the substrate is approximately two times the size of the antenna structure.

21. The RFID device of claim 13, wherein the first portion of the antenna and the second portion of the antenna are concealed by the substrate when the substrate is folded along the fold line.

22. The RFID device of claim 13, wherein the substrate has a plurality of extended portions.

23. The RFID device of claim 13, wherein the device has an EAS function.

24. The RFID device of claim 13, where the device functions at one of an ultra high, high or low frequency range.

* * * * *